Patented Oct. 11, 1938

2,132,484

UNITED STATES PATENT OFFICE 2,132,484

METHOD OF PREPARING MUCINOUS SUBSTANCES

Philip Adolph Kober, Chicago, Ill., assignor to G. D. Searle & Co., Chicago, Ill., a corporation of Illinois No Drawing. Application August 3, 1934, Serial No. 738,209

8 Claims. (Cl. 209—172)

My invention relates to a method of preparing mucinous substances of vegetable origin that are particularly adapted for use in treating ulcerous conditions of the stomach and intestines.

Mucinous or mucin-like substances are very widely distributed throughout the vegetable kingdom. They resemble animal mucins more or less closely in their physical properties such as stickiness, sliminess, and the like. They also resemble animal mucins in that they contain uronic acids, and exhibit a beneficial effect on ulcers of the alimentary tract.

It has been recognized that the animal mucins, as obtained from the animal sources heretofore available, present certain disadvantages from the standpoint of odor, taste and presence of undesirable substances inextricably associated with them even when they have been subjected to expensive purifying treatments. Consequently, there has been a need for a substitute for animal or gastric mucin that would be more easy to administer internally, is less expensive to prepare, and at the same time is free from the undesirable substances usually associated with gastric mucin. To fill this need I have invented a way of preparing mucinous substances of vegetable origin which are free of many of the disadvantages of gastric mucin and which show the beneficial or curative properties of the latter in increased degree.

I am aware of some of the prior art attempts to prepare mucinous substances from plant materials. In such processes it is generally customary to extract the mucin content of the plant material with water or other active solvent. However, due to changes in color, in odor, in taste, and in physical properties, it is evident that mucin-like substances prepared in this way, and particularly when hot water is used, have undergone some change with possible losses of valuable constituents and formation of objectionable substances. Among the various constituents of these plant substances, the uronic acids are conspicuous for their sensitiveness to destructive agencies. Experiments that I have performed give evidence that uronic acids are, at least in part, destroyed by simply heating with water. Not only are their desirable properties destroyed, but there is reason to believe that they are partially converted into irritating and undesirable substances such as furfural and the like. As an example of the latter, I have observed mucin-like substances, prepared by heating with water, in which the odor of furfural was evident.

Uronic acids are much more resistant to injury when they are in the dry state, and there is no indication that they are injured during the preparation of mucinous substances by my method, which as far as the mucin content is concerned, is an effectively dry method. While it is true that the value of uronic acids in such a product is not absolutely proven, the clinical tests mentioned above give some presumptive evidence of their value, and I therefore consider it advisable to preserve them. An example of the clinical tests that give evidence of the curative values of uronic acid is disclosed in an article by L. A. Crandall, Jr., and G. M. Roberts, published in the Proceedings of the Society for Experimental Biology and Medicine, March, 1933, volume 30, pages 704–706.

One of the objects of my invention is to provide an improved method for preparing physiologically active mucinous substances from vegetable materials.

Another object of my invention is to provide methods and means for preparing mucinous substances of vegetable origin, having high demulcent value, in such a manner that the uronic acid content of the substance as well as the natural pleasant odor and flavor of the substance are fully preserved.

My invention consists essentially in separating mucinous substances from vegetable sources without subjecting them to the action of water or other solvents which are active toward said substances. I employ liquids that are inert toward the mucinous substances, that do not cause them to swell or dissolve, and do not produce physical or chemical changes in said substances. According to my invention the plant material is first subjected to such preliminary physical treatment as is necessary, such as cleaning, grinding, crushing, sifting, winnowing, and the like. By these preliminary measures it is possible to effect a partial concentration of the mucinous substances or of those parts of the plant product which are particularly rich in said substances.

Following this preliminary step the crude material is subjected to treatment with an inert liquid of considerable density. I have learned that the mucinous parts of certain plant products differ in density from other parts and that treatment of the products with inert liquids of appropriate density will cause certain parts to float and will permit certain other parts to sink. In general, I use liquids of such density that the mucinous parts sink therein, while the waste parts float, because the mucinous parts are commonly the more dense. However, in certain cases this condition may be reversed so that the mucinous parts float and the waste parts sink. In either case those parts that float are mechanically skimmed off, the parts which sink are gathered up, and the separating liquid removed from each. Subsequently to the removal of the liquid the mucinous part is subjected to such further treatment as is desired such as grinding, blending with other materials, and the like. In the co-pending application of the applicant and Raymond W. Crosley, Serial No. 738,208, filed August 3, 1934, now Patent No. 2,095,259, dated October 12, 1937, is described certain practices which still further improve my product.

Among the conspicuous advantages of my invention may be mentioned the following: The uronic acid content, which is present in my product in notable amounts, and which is a recognized constituent of gastric mucin and many demulcent substances of proven value, is fully preserved. The natural characteristics of the vegetable mucin or mucinous substances such as appearance, color, pleasant taste and odor, are all preserved by my process, as contrasted with mucin obtained from the digestive organs of animals by acid extraction and also that obtained from plant materials by treatment with active solvents. As mentioned above this constitutes a distinct improvement, for these characteristics although apparently somewhat superficial, determine to an appreciable extent the physiological and commercial value of mucinous products. Furthermore, the mucinous substances of my invention are not dissolved by gastric juices and their viscosity is not seriously impaired by the acidity of the stomach. In fact, I have found that my product retains its demulcent properties at an acidity considerably greater than that found in the stomach. This constitutes a further improvement over the animal type mucins which partially lose their demulcent value under conditions of hyperacidity. Furthermore, my mucinous substances retain these demulcent properties throughout the whole length of the alimentary tract, and provide mucinous non-irritating bulk. This combats the constipating action of the special bland diets which are commonly used in treating peptic ulcer, and leads to the production of large stools of good consistency, which is a valuable contribution to the treatment of this disease. This latter property of my mucinous substances makes them particularly suitable for use as a laxative medicine for curing and preventing constipation and without the ill effects commonly caused by the prior art drug type of laxatives.

Another advantage of my effectively "dry" process for treating plant materials is the production of mucinous substances that are free of parasites and are free of the objectionable products of decomposition and decay which are found in products prepared from animal or gastric mucin by wet processes. Also, because of my "dry" process of treating and because of my selection of materials, my mucinous substances are free of the deleterious secretagogues.

Mucin-containing plants are very widely distributed throughout the vegetable kingdom. Well known examples of plants that contain principles more or less mucin-like in properties are the following: root of *Althea officinalis*, root of *Glycyrrhiza glabra typica*, seeds of *Linum usitatissimum*, seeds of *Plantago psyllium* and *Plantago ovata*, and seed pods of *Hibiscus esculentus*. In the practice of my invention I have found it particularly advantageous to use the seeds of the plants of the Plantago family, and the seeds of *Linum usitatissium*, but it is to be understood that my invention is applicable to various other mucin-containing plant materials, and is not limited to the seeds here mentioned.

Previous to my invention, the mucin-containing hulls of the seeds of the Plantago family were usually separated from the seeds by cracking, sifting, or winnowing. Such hulls are not sufficiently pure for use in the treatment of ulcers. They contain a considerable proportion of fibrous material, and of sharp cornered and irritating detritus, and of dark colored material. These impurities are in part attached to the hull substance, and are an integral portion of its structure. Even when the commercial hulls are ground quite fine I still find considerable adherence between the valuable and the waste portions.

For these reasons I have found it advisable to use a special type of procedure for cracking loose the hulls, although it is not intended to limit the use of my invention to hulls prepared in any special manner. This method of cracking loose the hulls consists in using the common hammer or impact mill in a manner which will be described in detail below. This hammer or impact mill method results in the production of crude hulls which contain large quantities of detritus but which have the advantage of being finely divided, and the further advantage that the detritus is less intimately bound to the mucinous substance than is charactertistic of the hulls treated by prior methods, and hence may be more easily separated by my procedure.

The following examples serve to illustrate the practice of my invention, and it is understood that various modifications of the methods, means and materials will be obvious to those skilled in the art.

Example I

This example illustrates my method for separating the mucinous substances in substantially pure form from the seeds of *Plantago ovata*, or similar seeds. The mucinous constituents of these seeds are found in an outer hull or rind which is light in color and contains the mucinous substances in a relatively pure state. A fine cellular structure appears to be present, but no fibres or rough woody parts. However, this outer rind lies upon and in intimate connection with a layer of dark colored fibrous or woody substance which is capable of forming rough and irritating detritus. It is my purpose to obtain the white outer layer substantially free from other parts of the seeds and this is accomplished in the following manner: The whole seeds are fed slowly into an impact mill so that the mill is never filled to capacity. Here the seeds are thrown into contact with rapidly revolving steel hammers which may travel at a speed of nearly 200 feet a second. Thus the seeds are neither crushed nor bruised between opposing surfaces, but are subjected to successive sharp blows, the force of which depends upon the inertia of the seeds themselves. This treatment causes the white outer hull to be loosened from the inner brown parts to a greater extent than is accomplished by other methods of cracking. The white outer hull is disintegrated into relatively fine particles of which the majority will pass a 25 mesh sieve. At the same time considerable detritus is formed from other parts of the seeds, but this is not, except in small degree, attached to the particles of white substance, and it may be separated by the succeeding treatment. The unbroken seeds are sifted out by means of screens and may be discarded or used for other purposes. With seeds of Plantago ovata I have found that screens with 20 to 25 meshes to the inch give good results. One hundred pounds of seeds may yield as much as thirty-five pounds of crude hulls.

I have found that the dark colored and woody parts of the seeds, referred to above, have a lower density than the mucinous parts and may be removed therefrom by flotation in an appropriate liquid. This may be done in the following manner: One hundred pounds of crude hulls are put into a vat containing one thousand pounds more or less of chloroform, and thoroughly mixed therewith. The mixture is allowed to stand a short time until the detritus comes to the surface and the mucinous parts sink to the bottom. The top layer is skimmed off and deposited on a filter. The chloroform may be recovered therefrom by means of a still or other appropriate means, and the solids may be discarded or used for other purposes. An additional amount of chloroform is now added to the vat to make up for the loss in skimming, and the contents of the vat are agitated again. Upon standing a short time, a new portion of detritus rises to the surface and is skimmed off. This skimming step is repeated several times if necessary until the mucinous material is freed of detritus. It is not uncommon to find that a considerable portion of useful material is skimmed off along with the detritus, especially when so large a proportion of crude hulls has been added to the vat that the mixture does not settle freely. In this case the skimmings may be thrown into a second vat of chloroform and agitated therein so that there is a further settling and separation.

When repeated agitation, settling, and skimming as described above, has fully removed the detritus from the mucinous material, the latter is removed from the treating vat to a filter, and the chloroform is allowed to drain away. The last traces of chloroform are removed by evaporation, preferably in a closed apparatus such as a still, so that the chloroform may be recovered. The dried mucinous material may then be pulverized or otherwise treated as desired. Also it may be mixed with other materials and may be further improved in the manner disclosed in the Kober and Crosley Patent No. 2,095,259 hereinbefore mentioned.

During the treatment of the hulls with liquid it is sometimes found that a small amount of sand or other heavy impurities are present. This sinks quickly to the very bottom of the vat and may be allowed to remain there, since most of the clean hulls may be removed without disturbing the sand. Since a good quality material contains only a very small proportion of sand and the like, this may be allowed to accumulate during several runs before cleaning the vat. If desired, any of the suitable well known mechanical separating devices may be used to separate the sand from the hulls. However, I have not found the latter expedient to be necessary. Also, the bottom of the vat may be provided with a grating or with small pits for the purpose of holding the sand and permitting the recovery of clean hulls.

Treatment of the hulls with an inert liquid such as chloroform produces a light colored product because the dark colored parts of the seeds are removed and because there is no darkening caused by the treating liquid itself. The mucinous substance obtained by my process from seeds of Plantago ovata is nearly white in color. Furthermore the oils and various fatty substances are removed by the chloroform so that the mucinous substances do not become rancid on storage as is the case with hulls that contain oils and fatty substances.

Liquids other than chloroform that are similarly inert toward the desired constituents of the mucinous material may be used to separate and purify the hull constituents, for example, a liquid heavier than chloroform may be mixed with a liquid lighter than chloroform to produce a mixture of about the same density as chloroform. Thus, one or more heavy liquids such as carbon tetrachloride, tetrachlorethane, tetrachlor-ethylene, ethylene bromide, and the like may be mixed with one or more lighter liquids such as, ethylene dichloride, butyl chloride, ethyl alcohol, amyl alcohol, propyl ether, amyl acetate, benzene, gasoline, and the like, in such proportions that the mixture has a density similar to that of chloroform. A mixture, which I have found very satisfactory and has the advantage of cheapness, consists of ten volumes of ethylene dichloride mixed with twenty-one volumes of carbon tetrachloride.

It is sometimes advantageous to use liquids or mixtures of liquids having a density somewhat different from that of chloroform. The reason for this is that in some instances there occur in the crude hulls, even with our improved system of cracking, considerable numbers of compound particles which contain both mucinous substance and detritus. These particles have various mean densities, depending upon the relative proportions of their constituents. When a light liquid is used, a relatively large number of these mixed particles will sink and the mucinous material will be contaminated with detritus. This usually occurs when a relatively light liquid is used such, for example, as the one consisting of equal volumes of ethylene dichloride and carbon tetrachloride. When a relatively heavy liquid is used, practically all of these mixed materials will float and at the same time the mucinous material will slowly sink. The mucinous material obtained in the latter manner is in a very pure form but from a commercial standpoint the operation is slower than desired and the losses are comparatively large. In practice I have found that a mixture of three volumes of ethylene dichloride with seven volumes of carbon tetrachloride gives a satisfactory yield of high-quality product in a reasonably short time. With such a mixture I have obtained as much as fifty pounds of high-quality mucinous material from one hundred pounds of crude hulls. However, other liquids or mixtures of liquids, such as those listed above, of similar density and inertness in respect of the mucinous material may be used to obtain very satisfactory results.

*Example II*

This example illustrates the application of my method in separating the mucinous substances in substantially pure form from the seeds of Linum usitatissimum, or similar seeds. The mucinous constituents of these seeds are found in the hull. Here they are associated with cellular material and some fibre, but this fibre is relatively soft and non-irritating. My purpose is to separate the mucin-bearing hull from other parts of the seed. The seeds are first crushed to produce a coarse meal. This may be done in any of the common ways, and I find it advantageous to do it by means of rolls, as this facilitates the subsequent separation. By this procedure the inner parts of the seed are mashed and considerably disintegrated. The hulls are tough and flexible, and resist the crushing. The meal thus obtained is rubbed through a sieve in such a manner that the disintegrated inner parts are forced through the sieve, while the hulls remain as flexible brown scales. However, the hulls are still grossly contaminated with pieces of the inner part of the seed which were too large to pass through the sieve.

The next step consists in separating the mucin-bearing hulls in pure form. The crude hulls are introduced into about twenty times their weight of ethylene dichloride. In this liquid the hulls sink and the inner parts of the seeds float. The inner parts are skimmed off and discarded. The hulls are washed repeatedly with ethylene dichloride or other solvent until they are free of oil. Then they are dried, and after drying they may be subjected to further treatment, such as pulverizing, etc., and may be put to such uses as desired.

The above described purification of the hulls may be carried out by the use of liquids other than ethylene dichloride. Other liquid hydrocarbons or mixtures of such liquids of similar density and inertness in respect of the mucinous material may be used, as will be obvious to those skilled in the art. Also liquids or mixtures of liquids may be used which are either somewhat heavier or somewhat lighter than ethylene dichloride. In practice I have found ethylene dichloride to be very satisfactory because of its cheapness and because of its efficient action, both in separating the hulls from other parts of the seeds and in removing oil.

It is to be understood of course that my invention is not limited to the description given hereinabove, by way of example, but is subject to various modifications of the proportions and components of the separating liquids, the mucin-containing plant materials, and the processes of preparation. In keeping with the more detailed description hereinabove set forth, the term "liquid" as used in the appended claims is not to be construed as limited to a single liquid chemical compound of the class specified but shall be deemed to include liquid mixtures of the said compounds and their equivalents for the purpose intended. It is desired that my invention be limited only by the prior art and the appended claims.

What I claim is:

1. In the process of preparing physiologically active mucinous substances from psyllium seeds the step of separating the mucinous substances from the non-mucinous substances consisting of depositing the mucin-containing parts of psyllium seeds in chloroform which is chemically inert to said mucinous substances, causing neither physical nor chemical changes therein, and in which the mucinous constituents separate from their normally associated non-mucinous parts by reason of the differences in their respective densities.

2. A process of preparing refined vegetable mucinous material, adapted for use in the treatment of diseases of the digestive tract, from seed hulls containing relatively large amounts of mucinous substances associated with cellulose, fiber, and other waste materials which would be irritating to the digestive tract, comprising subjecting a heterogenous mass of said hulls, which have been previously separated from the inner seeds or germs and disintegrated to loosen the mucinous substances from said cellulose, fiber, and other associated waste materials, to flotation in a halogenated hydrocarbon liquid which does not cause said mucinous substances to swell or dissolve and which is of proper density to cause the mucinous substances to separate from the associated particles of waste materials by reason of the differences in their respective densities, and removing said separated mucinous substances from said waste materials and flotation liquid.

3. A process of preparing refined vegetable mucinous material, adapted for use in the treatment of diseases of the digestive tract, from seed hulls containing relatively large amounts of mucinous substances associated with cellulose, fiber, and other waste materials which would be irritating to the digestive tract, comprising subjecting a heterogenous mass of said hulls, which have been previously separated from the inner seeds or germs and disintegrated to loosen the mucinous substances from said cellulose, fiber, and other associated waste materials, to flotation in a non-aqueous chlorinated hydrocarbon liquid which does not cause said mucinous substances to swell or dissolve and which is of proper density to cause the mucinous substances to separate from the associated particles of waste materials by reason of the differences in their respective densities, and removing said separated mucinous substances from said waste materials and flotation liquid.

4. A process of preparing refined vegetable mucinous material, adapted for use in the treatment of diseases of the digestive tract, from seed hulls of *Plantago ovata* containing relatively large amounts of mucinous substances associated with cellulose, fiber and other waste materials which would be irritating to the digestive tract, comprising subjecting a heterogenous mass of said hulls, which have been previously separated from the inner seeds or germs and disintegrated to loosen the mucinous substances from said cellulose, fiber, and other associated waste materials, to flotation in a chlorinated hydrocarbon liquid which does not cause said mucinous substances to swell or dissolve and which is of proper density to cause the mucinous substances to separate from the associated particles of waste materials by reason of the differences in their respective densities, and removing said separated mucinous substances from said waste materials and flotation liquid.

5. A process of preparing refined vegetable mucinous material, adapted for use in the treatment of diseases of the digestive tract, from seed hulls of *Plantago psyllium* containing relatively large amounts of mucinous substances associated with cellulose, fiber, and other waste materials which would be irritating to the digestive tract, comprising subjecting a heterogenous mass of said hulls, which have been previously separated from the inner seeds or germs and disintegrated to loosen the mucinous substances from said cellulose, fiber, and other associated waste materials, to flotation in a chlorinated hydrocarbon liquid which does not cause said mucinous substances to swell or dissolve and which is of proper density to cause the mucinous substances to separate from the associated particles of waste materials by reason of the differences in their respective densities, and removing said separated mucinous substances from said waste materials and flotation liquid.

6. A process of preparing refined vegetable mucinous material, adapted for use in the treatment of diseases of the digestive tract, from seed hulls of *Linum usitatissimum* containing relatively large amounts of mucinous substances associated with cellulose, fiber, and other waste materials which would be irritating to the digestive tract, comprising subjecting a heterogenous mass of said hulls, which have been previously separated from the inner seeds or germs and disintegrated to loosen the mucinous substances from said cellulose, fiber, and other associated waste materials, to flotation in an inert halogenated hydrocarbon liquid which does not cause said mucinous substances to swell or dissolve and which is of proper density to cause the mucinous substances to separate from the associated particles of waste materials by reason of the differences in their respective densities, and removing said separated mucinous substances from said waste materials and flotation liquid.

7. In the process of preparing refined physiologically active mucinous substances from a heterogenous mass of distintegrated seed materials from which the inner seeds or germs have been removed and which contain the mucinous substances intermixed with other non-mucinous irritating waste materials, the step of subjecting said mass to flotation in an inert brominated hydrocarbon liquid which is chemically and physically inert to said mucinous substances and which is of such density that it causes the mucinous substances to separate from said non-mucinous waste materials by reason of the differences in their respective densities.

8. A process of preparing refined physiologically active mucinous material from psyllium seeds comprising grinding the seeds to loosen the mucin-containing hulls from the inner germ or seed parts of the seeds, sifting the ground mass to separate the hulls from said other parts, subjecting said hulls to flotation in chloroform to effect separation of the mucinous content of the hulls from the other non-mucinous parts thereof, and removing said separated mucinous parts from the chloroform.

PHILIP ADOLPH KOBER.